US012650571B2

(12) United States Patent
McMaster

(10) Patent No.: US 12,650,571 B2
(45) Date of Patent: Jun. 9, 2026

(54) OPTICAL ELEMENT ASSEMBLY

(71) Applicant: CORNING INCORPORATED,
Corning, NY (US)

(72) Inventor: Brian Monroe McMaster, Pittsford,
NY (US)

(73) Assignee: CORNING INCORPORATED,
Corning, NY (US)

( * ) Notice: Subject to any disclaimer, the term of this
patent is extended or adjusted under 35
U.S.C. 154(b) by 307 days.

(21) Appl. No.: 18/379,453

(22) Filed: Oct. 12, 2023

(65) Prior Publication Data

US 2024/0151929 A1     May 9, 2024

Related U.S. Application Data

(60) Provisional application No. 63/423,203, filed on Nov.
7, 2022.

(51) Int. Cl.
G02B 7/02      (2021.01)
G02B 7/00      (2021.01)
(52) U.S. Cl.
CPC .............. G02B 7/003 (2013.01); G02B 7/02
(2013.01)
(58) Field of Classification Search
CPC ............. G02B 7/003; G02B 7/02; G02B 7/00
USPC ........................................................ 359/819
See application file for complete search history.

(56) References Cited

U.S. PATENT DOCUMENTS

| | | |
|---|---|---|
| 2004/0021865 A1 | 2/2004 | Byer et al. |
| 2007/0171552 A1* | 7/2007 | Holderer ............. G03F 7/70808 |
| | | 359/819 |
| 2007/0177102 A1* | 8/2007 | Kim ......................... G02C 1/02 |
| | | 351/178 |
| 2012/0105799 A1* | 5/2012 | Stewart .................. G02C 11/12 |
| | | 351/158 |
| 2017/0155807 A1 | 6/2017 | Zhang et al. |
| 2018/0305972 A1* | 10/2018 | Stark ................... E06B 3/66357 |
| 2019/0004275 A1 | 1/2019 | Mcmaster et al. |
| 2020/0185272 A1* | 6/2020 | Subbaiyan ........ H01L 21/76898 |
| 2022/0317392 A1* | 10/2022 | Izawa .................. G02B 6/4228 |

OTHER PUBLICATIONS

International Search Report and Written Opinion of the International Searching Authority; PCT/US2023/036329; dated Mar. 6, 2024; 14 pages; European Patent Office.
"Glass, Ceramics, & Low Solderability Metals", Cerasolzer Promo Brochure; Kuroda Techno Co., Ltd, 8 Pages (2011).

* cited by examiner

*Primary Examiner* — William R Alexander
(74) *Attorney, Agent, or Firm* — Amy T. Lang; Ye Eun
Park

(57) ABSTRACT

A method of connecting an optical element to a mount, the method including attaching a connector to an optical element with a first solder and heating the first solder with an ultrasonic heater to form a first soldering bond between the connector and the optical element, aligning the optical element within an inner opening of a mount, and attaching the connector to the mount with a second bond, wherein the first soldering bond is a polymer-free bond.

20 Claims, 7 Drawing Sheets

OPTICAL ELEMENT ASSEMBLY

This application claims the benefit of priority of U.S. Provisional Application Ser. No. 63/423,203 filed on Nov. 7, 2022, the content of which is relied upon and incorporated herein by reference in its entirety.

FIELD OF THE DISCLOSURE

This disclosure pertains to an optical element assembly, and more particularly to an optical mount coupled to an optical element with a polymer-free bond.

BACKGROUND OF THE DISCLOSURE

Optical elements, such as precision lenses, are secured to an optical mount for use in lithographic equipment. A compliant material is typically used to provide a bond between the optical element and the optical mount, to secure the two components together. The compliant material should have sufficient flexibility to reduce deformations induced on the optical element caused from the optical mount. More specifically, deformations caused from mechanical stresses or thermal strain of the optical mount. Conventionally, the compliant material is an organic polymer due to its ability to bond to both the optical element and the optical mount. Some conventional organic polymers include an organic adhesive, such as an epoxy resin or a cyanoacrylate resin.

However, use of organic polymers creates contamination issues that degrade the performance of the optical element over time. In some conventional systems, the optical element and optical mount are maintained in special atmospheric conditions in order to reduce the degradation of the organic polymer. But the requirement of such special atmospheric conditions can be very costly.

SUMMARY OF THE DISCLOSURE

According, a need exists to securely attach an optical element to an optical mount without relying on polymer-based bonds. Embodiments of the present disclosure are directed to polymer-free bonds between optical elements and optical mounts. In particular, embodiments of the present disclosure create a solder bond between an optical element and an optical mount, thus allowing the two components to be securely fastened while avoiding any such contamination issues associated with polymer-based bonds. Furthermore, a connector may be used to provide a link connecting the optical element and optical mount.

According to aspects of the disclosure, a method of connecting an optical element to a mount is disclosed. The method comprising attaching a connector to an optical element with a first solder and heating the first solder with an ultrasonic heater to form a first soldering bond between the connector and the optical element, aligning the optical element within an inner opening of a mount, and attaching the connector to the mount with a second bond. The first soldering bond being a polymer-free bond.

According to aspects of disclosure, an optical assembly is disclosed. The assembly comprising a mount, an optical element disposed within an inner opening of the mount, and one or more connectors attached to the optical element via a soldering bond, the soldering bond being a polymer-free bond comprised of one or more metal alloys.

DETAILED DESCRIPTION

Figure 1:
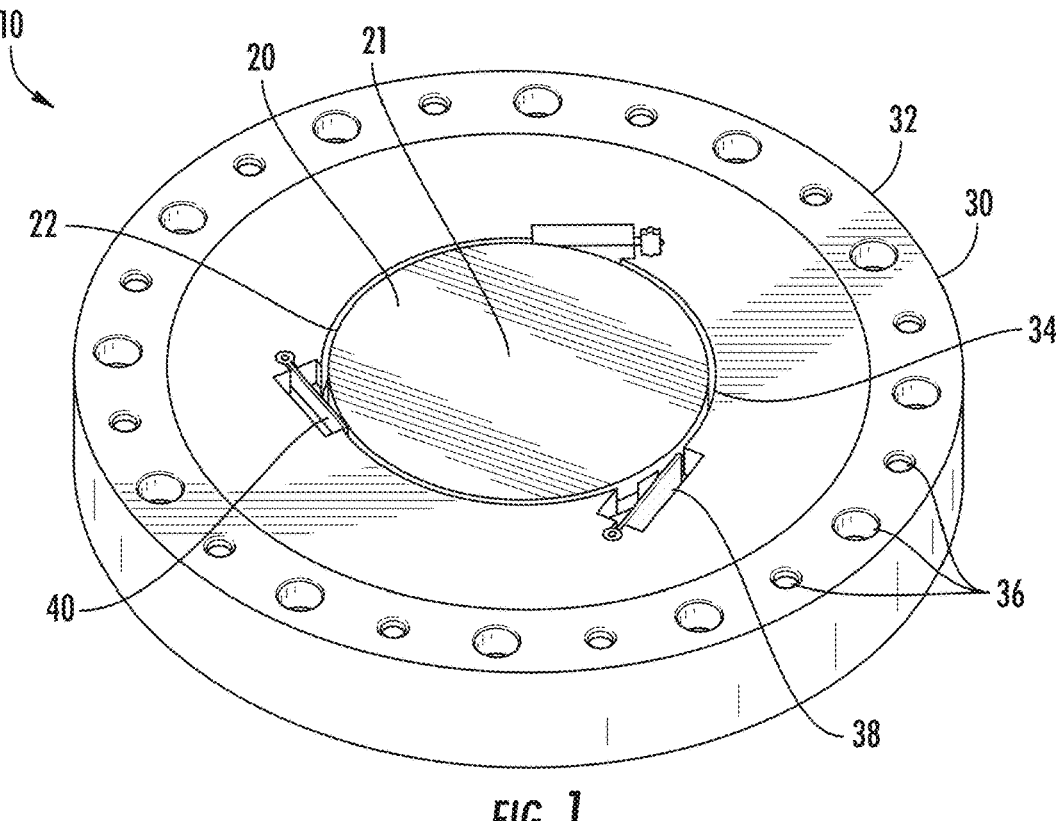
FIG. 1 is a perspective view of a schematic illustration of an optical assembly, according to embodiments of the disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the exemplary embodiments of the disclosure, examples of which are illustrated in the accompanying drawings. Whenever possible, the same reference numbers will be used throughout the drawings to refer to the same or like parts.

With reference to FIG. 1, an optical assembly 10 is shown comprising an optical element 20 secured to a mount 30. A plurality of connectors 40 may connect optical element 20 to mount 30. In embodiments, optical assembly 10 does not comprise a polymer bond to connect optical element 20 with mount 30. Thus, the connection between optical element 20 and mount 30 is polymer-free. Instead, connectors 40 may connect to each of optical element 20 and mount 30 through an ultrasonic soldering process.

Optical element 20 may be, in embodiments, a lens, a mirror, or a prism. In embodiments, optical element 20 is comprised of glass, glass ceramic, or ceramic. Glass and glass ceramic materials include, for example, silicate glass, aluminosilicate glass, alkali aluminosilicate glass, alkaline aluminosilicate glass, borosilicate glass, boro-aluminosilicate glass, alkali aluminoborosilicate glass, alkaline aluminoborosilicate glass, soda-lime glass, fused quartz (fused silica), or other types of glass. Exemplary glass materials include, but are not limited to, high purity fused silica HPFS® sold by Corning Incorporated of Corning, New York, and EAGLE XG® boro-aluminosilicate glass also sold by Corning Incorporated of Corning, New York. Other glass substrates include, but are not limited to, ultra-low expansion ULE® glass, Lotus™ NXT glass, Iris™ glass, WILLOW® glass, GORILLA® glass, VALOR® glass, Vycor™ glass, or PYREX ° glass sold by Corning Incorporated of Corning, New York. In some embodiments, optical element 20 is comprised of float glass, such as soda lime glass. In some embodiments, optical element 20 is comprised of magnesium fluoride and/or calcium fluoride. In yet other embodiments, optical element 20 is comprised of silica glass with 80 wt. % or more of silica, or 85 wt. % or more of silica, or 90 wt. % or more of silica, or 95 wt. % or more of silica, or 99 wt. % or more of silica.

Exemplary glass ceramics include, for example, lithium disilicate, nepheline, beta-spodumene, and beta-quartz. Exemplary commercially available materials include, for example, Macor® and Pyroceram® sold by Corning Incorporated of Corning, New York.

As shown in FIGS. 1-3B, optical element comprises a top surface 21, a bottom surface 23, and at least one side surface 25. Furthermore, an outer diameter 22 of optical element 20 (formed by side surface 25) is less than an inner diameter 34 of mount 30. Thus, when optical assembly 10 is assembled, optical element 20 is configured to fit within and be disposed within an interior portion of mount 30. As discussed further below, when optical assembly 10 is assembled, a gap may be provided between side surface 25 of optical element 20 and mount 30. Furthermore, optical element 20 and mount 30 are concentric when optical assembly 10 is assembled, as shown in FIG. 1.

In the embodiment of FIG. 1, optical assembly 10 comprises three connectors 40 equidistantly spaced around optical element 20 (for example, by a separation angle of 180°). However, it is contemplated that optical assembly 10 may comprise more or less connectors 40, and connectors 40 may be spaced apart with different configurations than shown in FIG. 1.

Mount 30 may form a donut shape with inner diameter 34 and an outer diameter 32. Thus, mount 30 may be a ring-shaped member. In embodiments, mount 30 is comprised of metal such as, for example, stainless steel alloy, nickel steel, titanium, aluminum, or brass. In some embodiments, mount 30 is comprised of glass, glass-ceramic, or ceramic, such as those described above with reference to optical element 20. As shown in FIG. 1, holes 36 may be formed on mount 30 for attachment to an alignment device, as discussed further below.

Mount 30 may be further assembled within an optical system including, for example, imaging and illumination systems, such as photolithography systems, semiconductor inspection systems, microscope assemblies, or polarization systems.

Although FIG. 1 shows optical element 20 and mount 30 as circular, it is noted that either or both of these components may comprise other shapes. For example, in some embodiments, an outer perimeter of mount 30 may be square-shaped.

Figure 2:
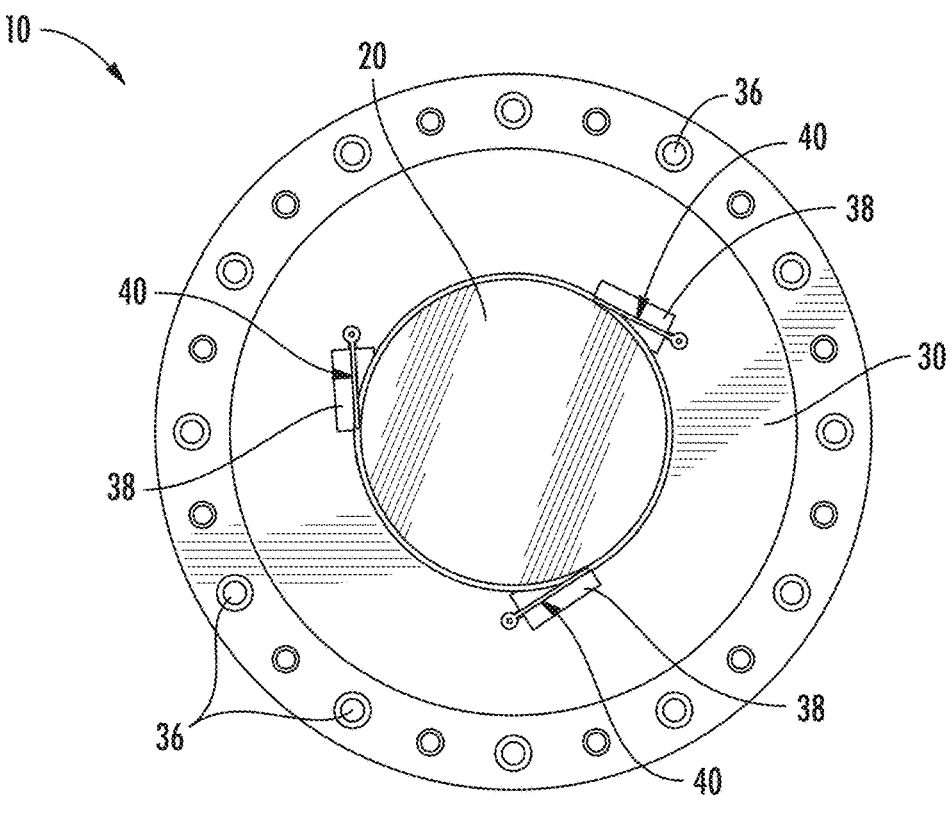
FIG. 2 is a top view of a schematic illustration of an optical assembly, according to embodiments of the disclosure.

As shown in FIGS. 1 and 2, connectors 40 provide an attachment between optical element 20 and mount 30. Thus, as discussed further below, connectors 40 may be separately secured to both optical element 20 and mount 30. In embodiments, connectors 40 may be comprised of metal, glass, glass-ceramic, or ceramic. Therefore, connectors 40 may be comprised of any of the materials described above with reference to optical element 20 and/or mount 30. Connectors 40 may be disposed within a well 38 formed within mount 30, as discussed further below.

Figures 3A, 3B:
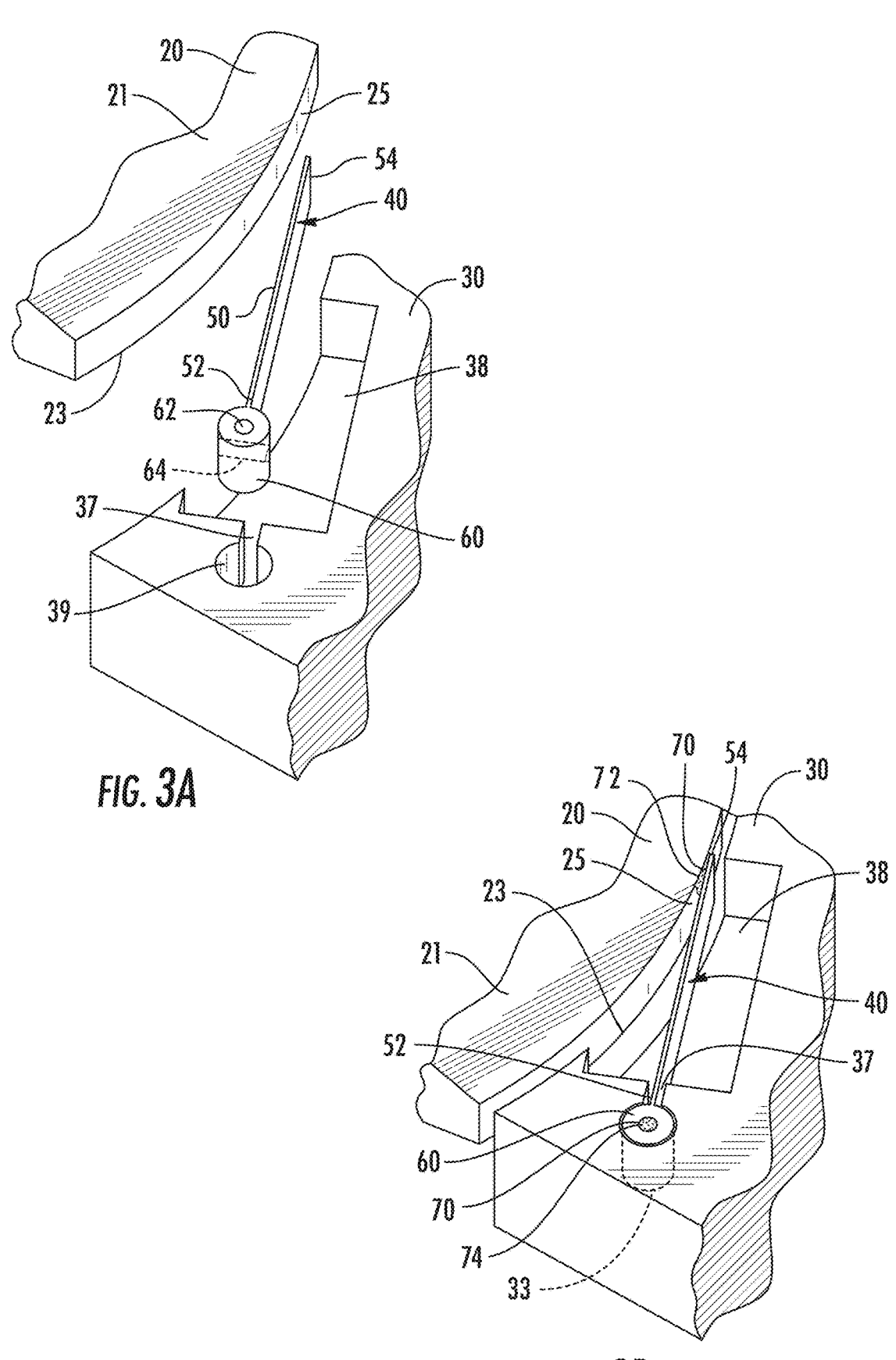
FIG. 3A is an enlarged view of an optical element, connector, and mount, according to embodiments of the disclosure.
FIG. 3B is another enlarged view showing bonds between the optical element, connector, and mount, according to embodiments of the disclosure.

FIG. 3A shows an enlarged view of connector 40 before its attachment to either optical element 20 or mount 30. And FIG. 3B shows an enlarged view of connector 40 after its attachment to both optical element 20 and mount 30 through ultrasonic soldering. With reference to FIG. 3A, connector 40 comprises an arm 50 connected to a retainer 60. Arm 50 may form a cantilever member extending from retainer 60. Furthermore, arm 50 may comprise a first end 52 connected to retainer 60 and a second end 54. Before its attachment to optical element 20, second end 54 of arm 50 is a free end. Furthermore, second end 54 of arm 50 may form a bearing surface for supporting optical element 20. As discussed further below, second end 54 of arm 50 is attached to the optical element 20 through an ultrasonic soldering process. First end 52 of arm may be connected to retainer 60 through any well-known attachment means. In some other embodiments, first end 52 and retainer 60 are a single, unitary member.

Retainer 60 may comprise a vertical opening 62 and/or a horizontal opening 64, which are used for securement to mount 30, as discussed further below. As also discussed below, retainer 60 may be disposed within a recess within mount 30 when optical assembly 10 is fully assembled.

Connectors 40 are sized and configured to provide a load bearing surface for optical element 20 as well as to decouple optical element 20 from any mechanical stress and/or thermal strains imparted on mount 30. Therefore, connectors 40 each act as a buffer to absorb any stress or strain imparted on mount 30 so that it does not reach or affect optical element 20. When optical assembly 10 is assembled, connectors 40 should be spaced apart a sufficient distance around optical element 20 to provide such load bearing and stress absorption features.

Figure 4:
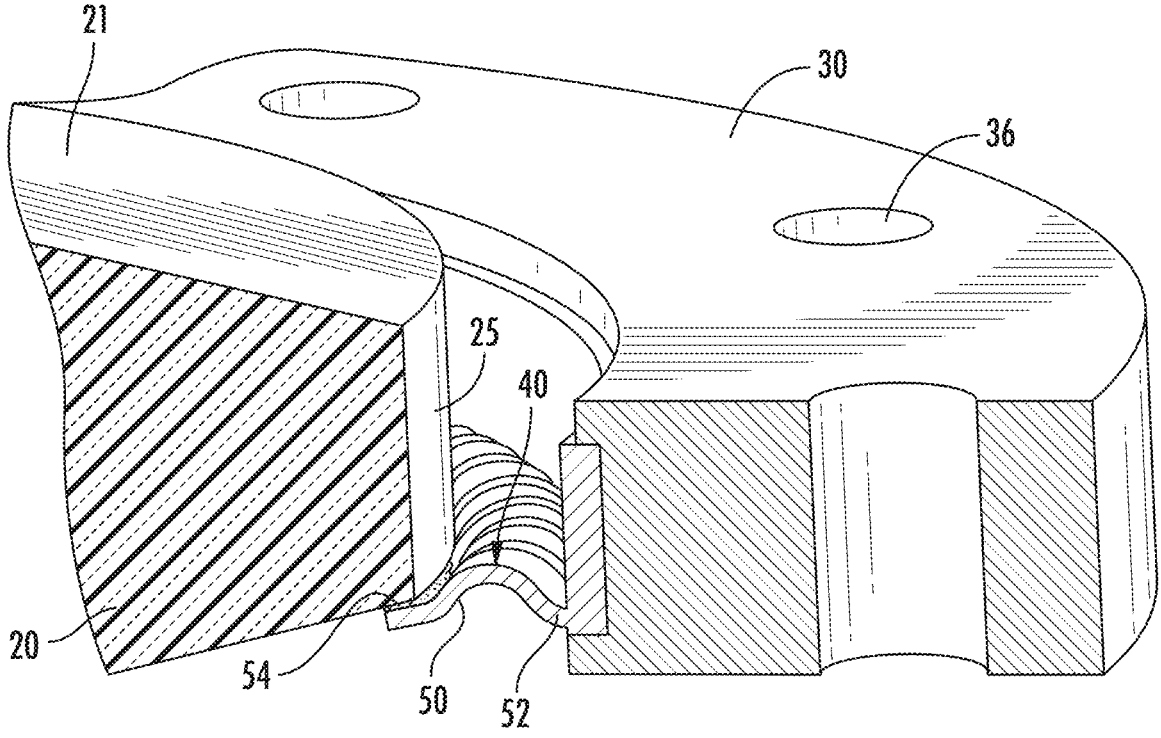
FIG. 4 is another perspective view of a schematic illustration of an optical assembly, according to embodiments of the disclosure.

Although FIG. 3A shows arm 50 of connector 40 as a straight, rectangular member, it is contemplated that arm 50 may comprise other shapes and configurations. For example, FIG. 4 shows an embodiment in which arm 50 forms an inverted U-shape profile between first and second ends 52, 54. In yet other embodiments, arm 50 may form an L-shaped profile, or an S-shaped profile, or a serpentine-shaped profile between first and second ends 52, 54.

With reference again to FIGS. 3A and 3B, connector 40 may be attached to optical element 20 and/or mount 30 through one or more soldering bonds 70. As discussed further below, soldering bonds 70 provide a mechanical attachment and may be formed through an ultrasonic soldering process. In particular, second end 54 of arm 50 of connector 40 may be attached to optical element 20 through a first soldering bond 72. As shown in FIG. 3B, first soldering bond 72 may directly attach optical element 20 to second end 54 of arm 50 so that no other components are disposed between optical element 20 and arm 50 (besides first soldering bond 72 itself). In embodiments, first soldering bond 72 specifically attaches second end 54 of arm 50 to side surface 25 of optical element 20. Thus, in some embodiments, only second end 54 of arm 50 is directly attached to optical element 20 via soldering bond 70. It is also contemplated, in some other embodiments, that a length of arm 50 longer than second end 54 is directly attached to optical element 20 via soldering bond 70.

Retainer 60 of connector 40 may be attached to mount 30 through a second soldering bond 74. As discussed further below, in order to attach retainer 60 to mount 30, retainer 60 may be disposed within a recess 39 in mount 30 and arm 50 may be disposed within well 38. As shown in FIGS. 3A and 3B, recess 39 connects to well 38 through passage 37. Second soldering bond 74 may be disposed within vertical and horizontal openings 62, 64 to provide a direct attachment between mount 30 and retainer 60 of connector 40 so that no other components are disposed between mount 30 and retainer 60 (besides second soldering bond 74 itself). In embodiments, second soldering bond 74 specifically attaches retainer 60 of connector 40 to a bottom surface 33 of recess 39 of mount 30. In yet other embodiments, retainer 60 may be connected to mount 30 through a different attachment means other than a soldering bond. For example, retainer 60 may be attached to mount 30 through a ceramic-based or polymeric-based attachment.

Figure 5A:
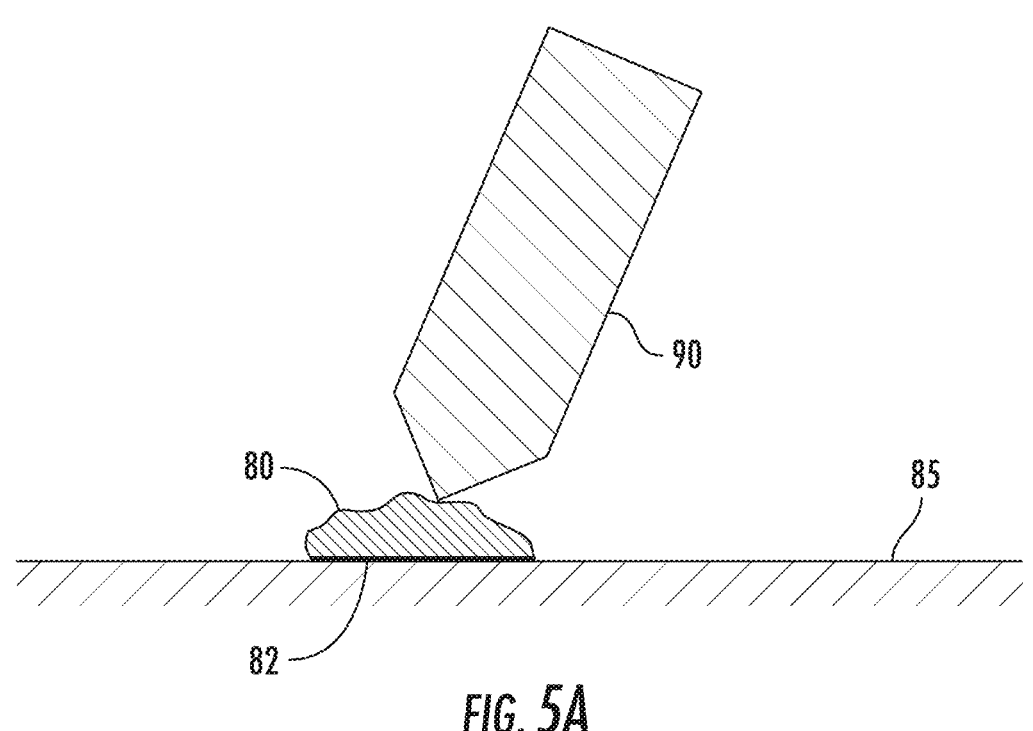
FIG. 5A is a schematic illustration of a process of forming a bond using an ultrasonic heater, according to embodiments of the disclosure.
Figure 5B:
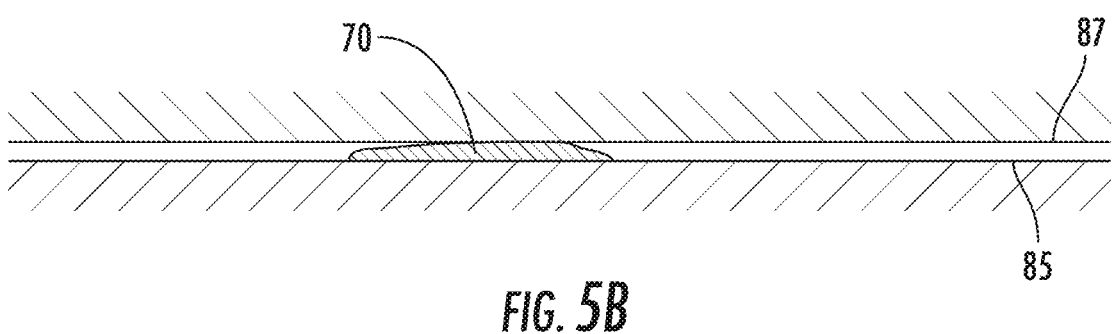
FIG. 5B is a schematic illustration of the formed bond using the ultrasonic heater, according to embodiments of the disclosure.

Soldering bond 70 (e.g., first soldering bond 72, second soldering bond 74) may be formed from a solder 80, as shown in FIG. 5A, that was melted or heated by an ultrasonic heater 90. For example, solder 80 may be disposed on at least a portion of a first surface 85, which may be one of connector 40, optical element 20, and mount 30. Once solder 80 is melted on first surface 85 by ultrasonic heater 90, a second surface 87 may be applied to solder 80 to attach first and second surfaces 85, 87. Solder 80 may then solidify to create soldering bond 70, thus forming an attachment between first and second surfaces 85, 87 through soldering bond 70 (as shown in FIG. 5B). Second surface 87 may be one of connector 70, optical element 20, and mount 30. Thus, for example, first surface 85 is connector 40 and second surface 87 is optical element 20. In other examples, first surface 85 is connector 40 and second surface 87 is mount 30.

It is noted that solder 80 may be used to create a secure and fixed attachment between components formed of the same or differing materials. Therefore, for example, first surface 85 may be formed of a different material than second surface 87. In some embodiments, first surface 85 is formed of glass and second surface 87 is formed of metal.

Solder 80 may be comprised of one or more metal alloys including, for example, tin (Sn), silver (Ag), copper (Cu), titanium (Ti), cerium (Ce), and gallium (Ga). In some embodiments, solder 80 comprises a majority of tin (i.e., greater than about 50 wt. %, or greater than about 60 wt. %, or greater than about 70 wt. %, or greater than about 80 wt. %, or greater than about 90 wt. %). Without wishing to be bound by theory, it is believed that inclusion of titanium in solder 80 helps to bond solder 80 to glass and that inclusion of cerium in solder 80 helps to prevent oxidation of soldering bond 70. In some embodiments, solder 80 is a preformed into a desired shape that mates with a joining part on connector 40.

In embodiments, soldering bond 70 may have a surface area on first and/or second surface 85, 87 sufficient to provide a secure attachment between first and second surfaces 85, 87. It is noted that the surface area of solder bond 70 is related to the number of connectors 40 used, such that less connectors 40 may require a larger surface area per each connector. The soldering bonds 70 in the assembled optical assembly 10 should be sufficiently strong to withstand shock loads from about $10 \times 9.81$ m/s$^2$ to about $50 \times 9.81$ m/s$^2$ for a period of about one millisecond, or about $20 \times 9.81$ m/s$^2$ to about $40 \times 9.81$ m/s$^2$ for a period of about one millisecond, or about $30 \times 9.81$ m/s$^2$ to about $35 \times 9.81$ m/s$^2$ for a period of about one millisecond. Thus, the soldering bonds 70 should not break when exposed to such shock loads.

Soldering bond 70 may create a bond between first and second surfaces 85, 87 such that the bond itself is stronger than either first surface 85 or second surface 87. Therefore, when the assembled optical assembly 10 is exposed to, for example, a torsional force, connector 40 will break first before soldering bond 70. In embodiments, soldering bond 70, when attached to a glass connector 40, can withstand a pressure load of about 1 pound per square inch (psi) to about 2,000 psi, or about 10 psi to about 1,500 psi, or about 100 psi to about 1,000 psi, or about 100 psi or greater, or about 500 psi or greater, or about 1,000 psi or greater, or about 1,500 psi or greater, or about 2,000 psi or greater. In embodiments, soldering bond 70, when attached to a metal connector 40, can withstand a pressure load of about 1 psi to about 200,000 psi, or about 10 psi to about 150,000 psi, or about 100 psi to about 100,000 psi, or about 100 psi or greater, or about 1,000 psi or greater, or about 10,000 psi or greater, or about 100,000 psi or greater, or about 200,000 psi or greater.

With reference again to FIG. 5A, ultrasonic heater 90 may heat solder 80 so that a reaction layer 82 forms between solder 80 and 85. Reaction layer 82 may be a transition region that forms a gradient between the materials of first surface 85 and solder 80. Therefore, the interface between first surface 85 and solder 80 may not have distinct borders. Instead, within reaction layer 82, the materials of solder 80 and first surface 82 may be interlaced with one another.

Ultrasonic heater 90 may comprise an oscillator that converts high-frequency electric current into vibrating ultrasonic waves. In some embodiments, ultrasonic heater 90 is a piezoelectric transducer. Ultrasonic heater 90 may operate at an oscillating frequency from about 10 kHz to about 100 kHz, or about 20 kHz to about 60 kHz and may have an output power from about 10 watts to about 1,000 watts. As is known the art, ultrasonic heater 90 may comprise a transducer and oscillator attached to a horn in order to produce the oscillating frequency. Although not shown in FIG. 5A, a tip of ultrasonic heater 90 may comprise an open passage through which air can flow in order to cool the transducer. Ultrasonic heater 90 may apply an ultrasonic application to a material (e.g., solder 80) such that the ultrasonic application relies on the phenomenon of cavitation in order to attach the material to first surface 85 or second surface 87, thus forming soldering bond 70.

Cavitation is the formation and subsequent collapse of bubbles in a material with rapidly changing pressure fields. More specifically, ultrasonic heater 90 induces ultrasonic wave vibrations on the material (e.g., solder 80) such that vibrations pass through the material. These vibrations, in particular, pass through the material as a series of compression and expansion waves. The compression and expansion waves create areas of relatively lower pressure and areas of relatively higher pressure within the material, which in turn cause the formation of cavities in the material. The cavities are in the form of bubbles, and the bubbles grow within the material with the continued application of the ultrasonic wave vibrations. The bubbles continue to grow until they reach a critical size, at which point the bubbles collapse and release high levels of energy and pressure, thus forming micro-jets. The micro-jets impact the surface upon which the material is being attached to. When the micro-jets impact the surface, they do so with such force that the micro-jets break up the oxide layer on the surface. By breaking up the oxide layer, the material is able to bond and securely attach to the surface. In embodiments disclosed herein, the material forming the micro-jets is solder 80 and the surface upon which the micro-jets break up the oxide layer is first surface 85 or second surface 87. In some particular embodiments, upon the ultrasonic application to solder 80, solder 80 forms micro-jets that break up the oxide layer on a connector 40 formed of glass. Furthermore, in some particular embodiments, upon the ultrasonic application to solder 80, solder forms micro-jets that break up the oxide layer on a connector 40 formed of metal. It is noted that without the disruption of the oxide layer on the glass or metal connector 40, the metal solder 80 would not be able to bond and attach to the glass or metal material of connector 40.

Once the material (e.g., solder 80) is secured to the surface (e.g., connector 40), the ultrasonic application is terminated and the material is allowed to solidify and harden, thus forming soldering bond 70 between the material and the surface. During the ultrasonic application, ultrasonic heater 90 may be heated to a temperature of about 450° C. or less, or about 400° C. or less, or about 350° C. or less, or in a range from about 100° C. to about 450° C., or about 150° C. to about 450° C., or about 200° C. to about 450° C., or about 100° C. to about 400° C., or about 150° C. to about 400° C., or about 200° C. to about 400° C., or about 250° C. to about 400° C.

It is also contemplated in some embodiments that the material (e.g., solder 80) may first be exposed to a preheating treatment before the ultrasonic application. The preheating treatment may comprise heating the material to melt and liquify (or at least partially liquify) the material. Liquefying the material allows the material to pass the ultrasonic wave vibrations (induced by ultrasonic heater 90) more efficiently throughout the material. Such helps to initiate the cavitation process, as discussed above. In some embodiments, the preheating treatment comprises heating the material to a temperature from about 100° C. to about 300° C., or about 150° C. to about 250° C., or about 200° C. to about 250° C.

In some embodiments, ultrasonic heater 90 also comprises a resistive heater that applies the preheating treatment to the material. In other embodiments, the preheating treatment is accomplished using a different heating device, separate from ultrasonic heater 90 such as, for example, conduction heating (e.g., a hot plate), convection heating, radiation heating, or induction heating.

Figure 5C:
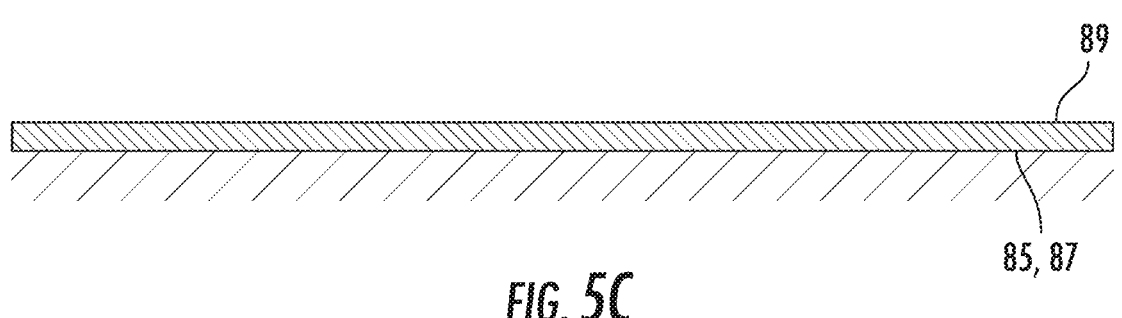
FIG. 5C is a schematic illustration showing an adhesion promoting coating on a surface of an optical element, connector, or mount, according to embodiments of the present disclosure.

In some embodiments, an adhesion promoting coating 89 may be disposed on at least one of first surface 85 and/or second surface 87 to promote adhesion of the surface(s) with solder 80, as shown in FIG. 5C. Adhesion promoting coating 89 may include, for example, titanates (such as Tyzor 131 commercially available from DuPont), zirconates, (such as Tyzor 217 commercially available from DuPont), silanes (such as SIB 1824 and SIB 1821 commercially available from Gelest), or a thin film metal such as, for example, nickel, stainless steel, aluminum, and/or indium.

Furthermore, prior to applying the solder 80, first surface 85 and/or second surface 87 may be prepared by stripping off organic material (such as the oxide layer discussed above) using a detergent or chemical application. This may be in addition to the ultrasonic application of ultrasonic heater 90, as discussed above. Additionally or alternatively, prior to applying solder 80, first surface 85 and/or second surface 87 may be cleaned of contaminants by applying a mild acid or using an ultraviolet (UV) ozone cleaning technique.

Figure 6:
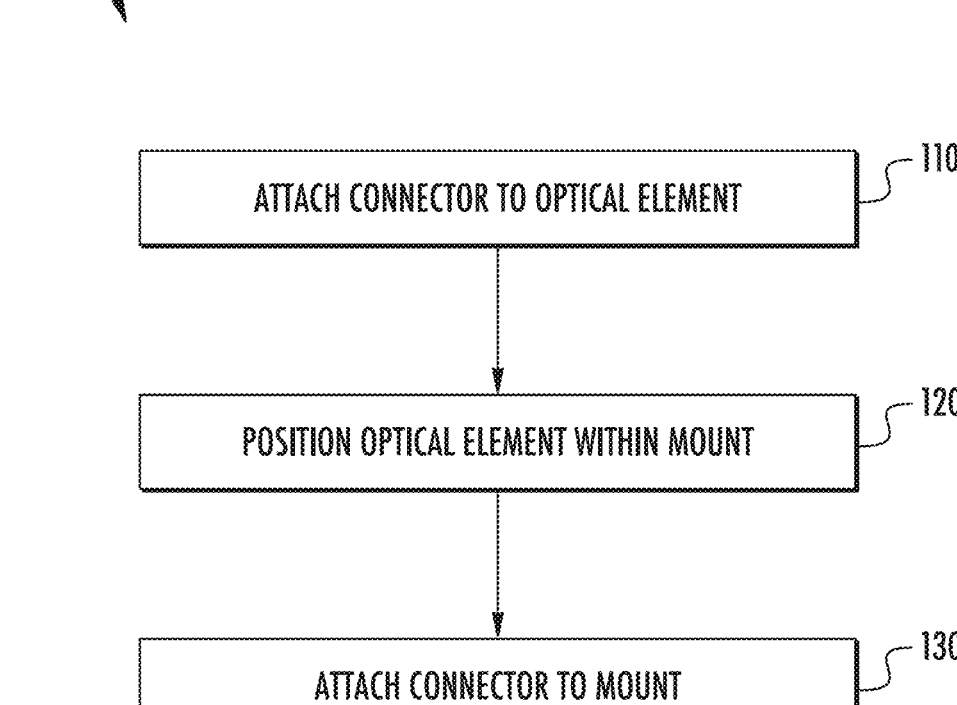
FIG. 6 shows a process to form an optical assembly, according to embodiments of the present disclosure.
Figure 7:
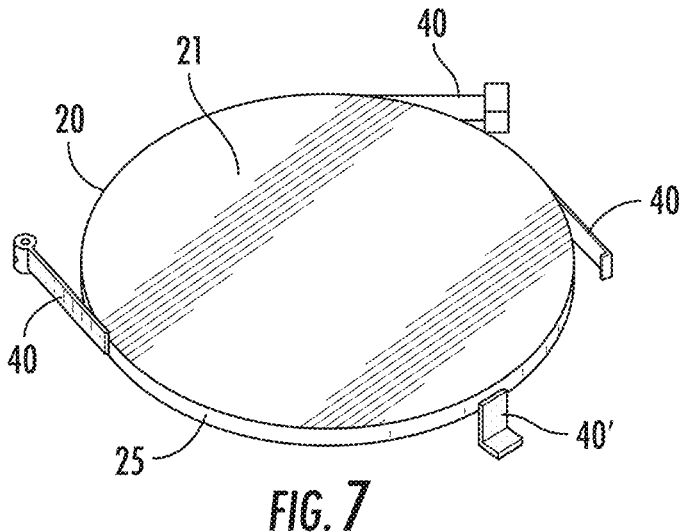
FIG. 7 is a schematic illustration of a plurality of connectors attached to an optical element, according to embodiments of the present disclosure.

A process 100 of forming optical assembly 10 is shown in FIG. 6. Process 100 comprises, in step 110, attaching one or more connectors 40 to optical element 20. As discussed above and as shown in FIG. 7, connectors 40 may be attached to a side surface 25 of optical element 20 during step 110. It is noted that FIG. 7 depicts an embodiment in which three connectors 40 all have the same configuration, while connector 40' comprises a different configuration.

Attachment of each connector 40 to optical element 20 during step 110 may comprise applying a solder 80 to second end 54 of each connector 40 and then heating solder 80 with ultrasonic heater 90, as discussed above. Therefore, ultrasonic heater 90 may apply the ultrasonic application to solder 80. In addition, solder 80 may be preheated prior to the ultrasonic application. Next, the connector 40 with the soldering bond attached thereto is then attached to optical element 20 such that solder 80 contacts both connector 40 and optical element 20. Connector 40 and optical element 20 may be held in specific and precise locations relative to each other (such as with an alignment device 200, as discussed below) when attaching connector 40, with the soldering bond attached thereto, to optical element 20. In embodiments, and as shown in FIG. 7, solder 80 is applied to side surface 25 of optical element 20. However, as discussed above, it is also contemplated that one or more connectors 40 may be attached to other surfaces of optical element 20. Once solder 80 is in contact with both connector 40 and optical element 20 and upon termination of the ultrasonic application, solder 80 solidifies and hardens to form soldering bond 70 (e.g., first soldering bond 72). As discussed above, the cavitation process (as induced by the ultrasonic application) causes the optical element 20 and connector 40 to be bonded together and attached via soldering bond 70.

In some embodiments, additional heat may be applied once solder 80 is in contact with both connector 40 and optical element 20. This additional heat may be applied to slow down the solidification of solder 80. Such may provide additional time to further align connector 40 and optical element 20 before they are bonded together and relatively fixed with the solidification and hardening of solder 80.

Figure 8:
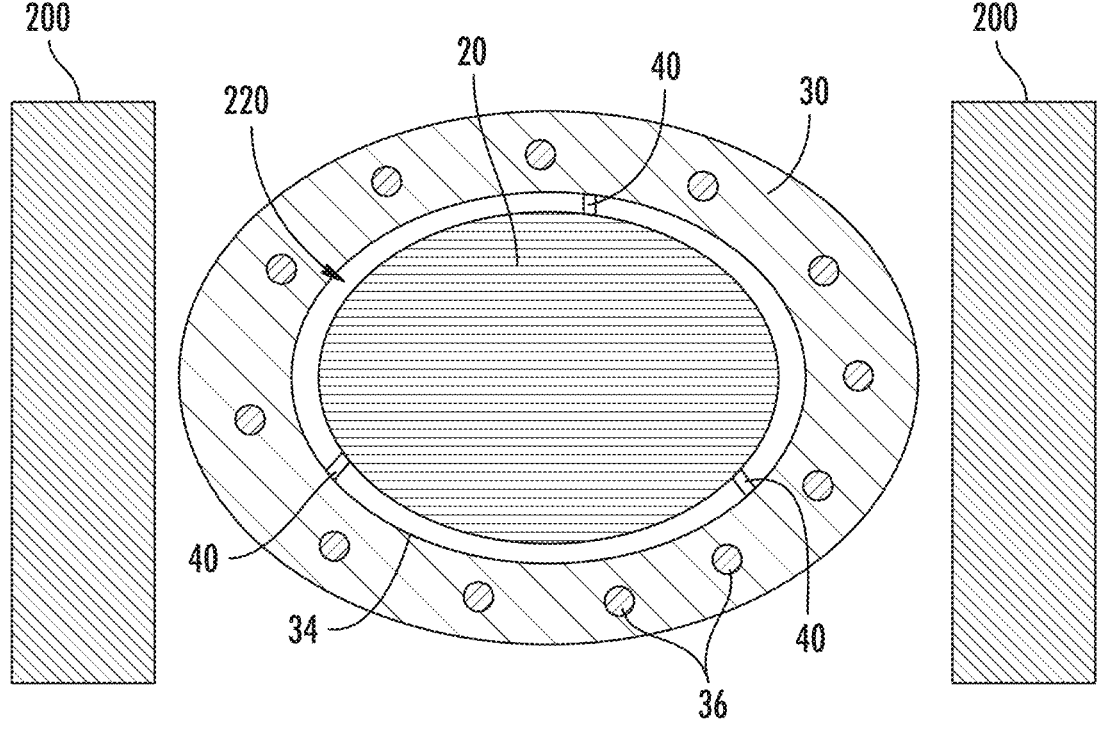
FIG. 8 is a top view of a schematic illustration of an optical assembly and an alignment device, according to embodiments of the present disclosure.

Referring again to process 100, in step 120, optical element 20 with one or more connectors 40 attached thereto is positioned within the ring-like structure of mount 30. Therefore, optical element 20 is positioned within the inner opening of mount 30 formed by inner diameter 34 (such as shown in FIG. 1). Furthermore, an alignment device 200, such as shown in FIG. 8 may be used to align optical element 20 relative to mount 30. FIG. 8 shows a top view of optical element 20 secured and bonded to connectors 40. However in FIG. 8, connectors 40 are not yet secured to mount 30. Alignment device 200 is used to properly position and align optical element 20 relative to mount 30 before securing these components together via soldering bond 70.

In some embodiments, alignment device 200 moves optical element 20 relative to mount 30 while mount 30 is held stationary during the positioning and alignment process. Therefore, optical element 20 may be oriented in various directions relative to mount 30 during the positioning and alignment process. Optical element 20 may move horizontally, (e.g., left and right) and vertically (e.g., up and down) and optical element 20 may be tilted at an angle relative to mount 30 to achieve the desired positioning and alignment with mount 30. In other embodiments, mount 30 moves relative to optical element 20 while optical element 20 is held stationary during the positioning and alignment process. Therefore, mount 30 may move horizontally and vertically and may be tilted at an angle relative to optical element 20. In yet some other embodiments, both optical element 20 and mount 30 move during the positioning and alignment process.

It is noted that alignment device 200 may attach to holes 36 on mount 30 in order to move and position mount 30 during the positioning and alignment process. Furthermore, a gap 220 may be disposed between optical element 20 and mount 30 during the positioning and alignment process of these components. Gap 220 may remain even after optical element 20 is secured to mount 30 via soldering bond 70. Therefore, when fully assembled in optical assembly 10, optical element 20 and mount 30 may still be separated by gap 220. In embodiments, gap 220 is about 0.20 mm to about 2.00 mm, or about 0.25 mm to about 1.75 mm, or about 0.50 mm to about 1.50 mm, or about 0.75 mm to about 1.25 mm, or about 1.00 mm to about 1.50 mm, or about 0.50 mm to about 1.00 mm.

In some embodiments, as noted above, alignment device 200 may also be used to align the relative positions of connector 40 and optical element 20 when securing these components together via soldering bond 70. However, it is also contemplated that another device, other than alignment device 200, may align the relative positions of connector 40 and optical element 20.

Furthermore, with reference to FIGS. 3A and 3B, during the positioning and alignment process of optical element 20 and mount 30, connectors 40 may each be disposed in well 38 of mount 30. In particular, at least a portion of arm 50 (that includes at least a middle portion of arm 50 between first end 52 and second end 54) is positioned within well 38 in order to facilitate movement of optical element 20 and mount 30 relative to each other. Well 38 provides clearance for connector 40 during the positioning and alignment process of optical element 20 and mount 30.

As also shown in FIGS. 3A and 3B, during the positioning and alignment process of optical element 20 and mount 30, retainer 60 of connector 40 is disposed within recess 39 and first end 52 of arm 50 is disposed within passage 37.

Once optical element 20 and mount 30 are properly positioned and aligned, connectors 40 may then be secured to mount 30 via soldering bond 70 (e.g., second soldering bond 74), as shown in step 130 of process 100. It is noted that during this connection, optical element 20 and/or mount 30 continues to be held in the desired position and alignment via alignment device 220. Furthermore, during this connection, connectors 40 have already been secured to optical element 20. Attachment of each connector 40 to mount 30 during step 130 may comprise applying a solder 80 to horizontal and vertical openings 62, 64 of each retainer 60 and then heating solder 80 with ultrasonic heater 90, as discussed above. Next, the connector 40 with the soldering bond attached thereto is then attached to bottom surface 33 of recess 39 of mount 30 such that solder 80 contacts both connector 40 and bottom surface 33. Upon attachment of connector 40 to mount 30 via solder 80, solder 80 solidifies and hardens to form soldering bond 70 (e.g., second soldering bond 74).

However, it is also noted that connector 40 may be attached to mount 30 via a ceramic-based or polymeric-based attachment in place of second soldering bond 74. When using such a ceramic-based or polymeric-based attachment, the ultrasonic application from ultrasonic heater 90 is not required.

Optical assembly 10 may be formed after attachment of connector 40 to mount 30 (and, thus, attachment of optical element 20 to mount 30). However, it is also contemplated in process 100 that connector 40 is first attached and secured to mount 30 before its attachment to optical element 20. Furthermore, in yet some other embodiments, connector 40 may be secured and attached to both mount 30 and optical element 20 simultaneously.

As shown in step 140 of process 100, after connector 40 is secured to mount 30, a filler material may be disposed in well 38 of mount 30 to firmly position connector 40 relative to mount 30. Thus, the filler material bonds to both well 38 and connector 40 (specifically, arm 50) to anchor connector 40. Upon hardening of the filler material, connector 40 may be unable to move independently of mount 30. Thus, connector 40 is firmly anchored to mount 30. Exemplary filler materials include, for example, inorganic materials such as glass, sand, or metal or a polymeric material.

It is also contemplated, in some embodiments, that such a filler material is not added to well 39 (or that mount 30 does not even comprise such a well). Instead, soldering bond 70 may provide the only attachment between connectors 40 and mount 30. Such allows for some flexibility of connectors 40 and, thus, some relative movement between optical element 20 and mount 30.

It is noted that in traditional assemblies that utilize polymer bonds to fasten an optical element to a mount, the polymer bonds can degrade or become contaminated overtime. Therefore, the bond must be removed and replaced after some period of time. Accordingly, the optical element and mount could not be firmly anchored to each other (such as with the filler material as disclosed above). Instead, a more temporary and less permanent attachment is required due to the unstable nature of the polymer bonds. In contrast to the traditional assemblies, the embodiments disclosed herein do not utilize polymer bonds to secure optical element 20 with mount 30 via connectors 40. Instead, as discussed above, soldering bonds 70 create a strong and polymer-free bond between these components. Due to the polymer-free aspect of bonds 70, the components are able to be more permanently fixed together via the filler material, thus creating a very stable and sturdy assembly.

Figure 9A:
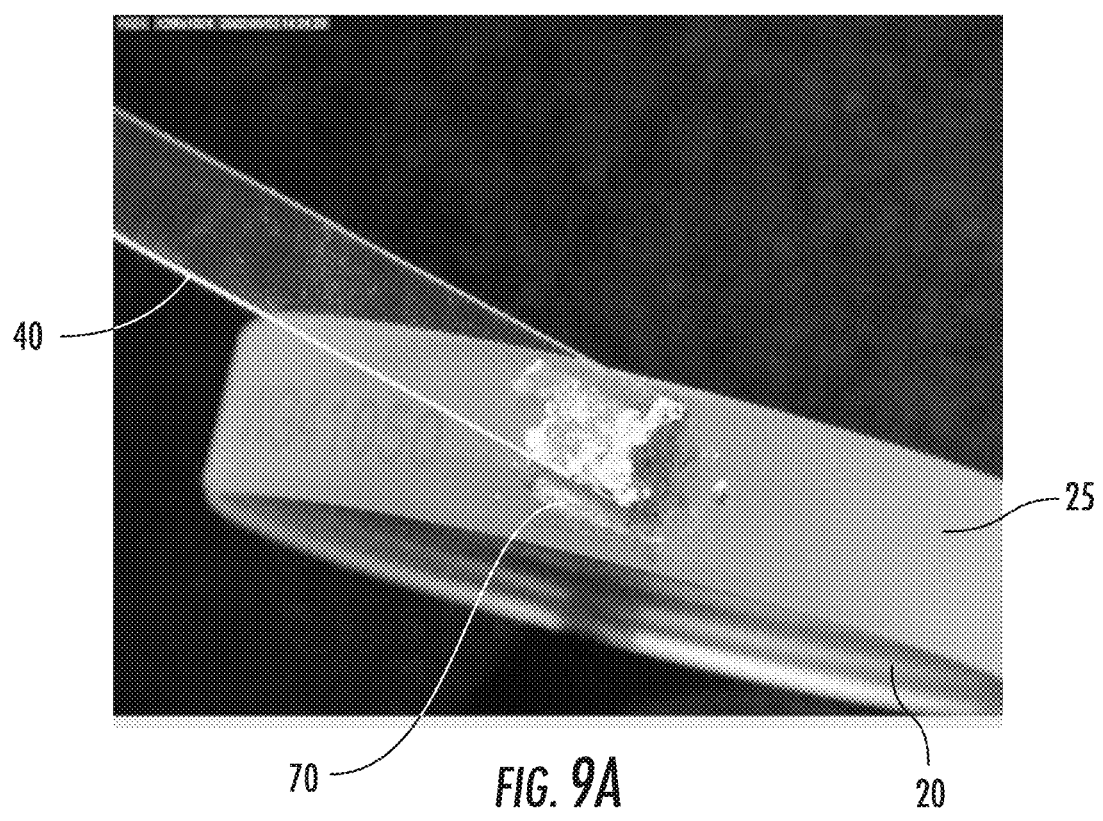
FIGS. 9A and 9B are images of a soldering bond formed between an optical element and a connector.
Figure 9B:
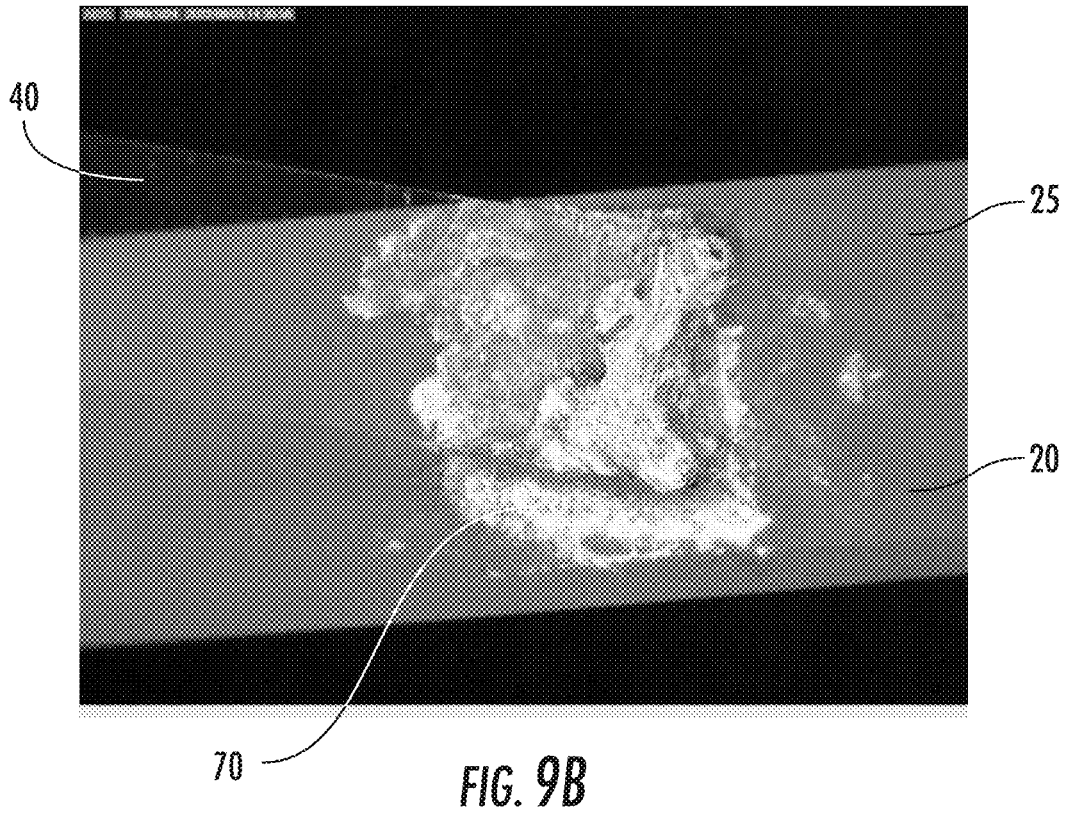

FIGS. 9A and 9B shows embodiments of a solder bond 70 formed between a glass connector 40 and a side surface 25 of a glass optical element 20. In the embodiment of FIGS. 9A and 9B, a solder material was placed on a surface of the glass connector and a solder material was placed on a surface of the glass optical element. The solder materials were then heated by an ultrasonic heater operating with an oscillating frequency of 65 kHz. A tip of the ultrasonic heater was set to 165° C. Next, the glass connector and the glass optical element were aligned using an alignment device and the two solder materials were brought in contact. The combined solder materials were then preheated by a hot plate operating at a temperature of 140° C. Finally, the ultrasonic heater applied the ultrasonic application to the combined solder material, during which the ultrasonic heater operated with an oscillating frequency of 65 kHz and a tip of the ultrasonic heater was set to 165° C. The ultrasonic application was then terminated, and the solder solidified into a soldering bond.

Unless otherwise indicated it is envisioned that any feature of any embodiment can, unless incompatible, be used in any other embodiment. Optical elements that may be employed include lens, mirrors and prisms.

The described embodiments are preferred and/or illustrated but are not limiting. Various modifications are considered within the purview and scope of the appended claims.

What is claimed is:

1. A method of connecting an optical element to a mount, the method comprising:
   attaching a connector to an optical element with a first solder, the connector comprising an arm connected to a retainer, the arm comprising a first end and a second end, the first solder being in contact with the second end of the arm;
   heating the first solder with an ultrasonic heater to form a first soldering bond between the connector and the optical element;
   aligning the optical element within an inner opening of a mount; and
   attaching the retainer of the connector to the mount with a second bond, wherein the first soldering bond is a polymer-free bond.

2. The method of claim 1, further comprising applying an oscillating frequency from about 10 kHz to about 100 kHz with the ultrasonic heater.

3. The method of claim 1, further comprising aligning the optical element within the inner opening of the mount with an alignment device.

4. The method of claim 3, wherein the alignment device moves the optical element relative to the mount to align the optical element with the mount.

5. The method of claim 1, wherein the method comprises forming the first soldering bond between the connector and the optical element before forming the second bond between the connector and the mount.

6. The method of claim 1, further comprising positioning the connector within a well within the mount.

7. The method of claim 6, further comprising filling the well with a filler material to fixedly secure the connector to the mount.

8. The method of claim 1, wherein the optical element is securely fixed to the mount via the connector.

9. The method of claim 1, wherein the first soldering bond comprises one or more of tin (Sn), silver (Ag), copper (Cu), titanium (Ti), cerium (Ce), and gallium (Ga).

10. The method of claim 1, wherein the second bond is a soldering bond that is a polymer-free bond.

11. The method of claim 10, wherein the second soldering bond comprises one or more of tin (Sn), silver (Ag), copper (Cu), titanium (Ti), cerium (Ce), and gallium (Ga).

12. The method of claim 1, wherein the optical element is a lens.

13. The method of claim 1, wherein the optical element comprises glass and the connector is comprised of metal and/or glass.

14. The method of claim 1, wherein the first soldering bond between the connector and the optical element can withstand a pressure load of about 500 psi or greater.

15. An optical assembly comprising:
   a mount;
   an optical element disposed within an inner opening of the mount; and
   one or more connectors, each connector comprising an arm connected to a retainer, the arm comprising a first end and a second end, the second end being attached to the optical element via a soldering bond, the soldering bond being a polymer-free bond comprised of one or more metal alloys.

16. The optical assembly of claim 15, wherein the mount is a ring-shaped member with an inner diameter and an outer diameter, the inner diameter forming the inner opening of the mount.

17. The optical assembly of claim 15, wherein the optical element comprises a top surface, a bottom surface, and a side surface, the soldering bond being directly attached to the side surface of the optical element.

18. The optical assembly of claim 15, wherein the one or more metal alloys comprise one or more of tin (Sn), silver (Ag), copper (Cu), titanium (Ti), cerium (Ce), and gallium (Ga).

19. The optical assembly of claim 15, wherein the soldering bond between the connector and the optical element can withstand a pressure load of about 500 psi or greater.

20. The optical assembly of claim 15, wherein the arm of the connector comprises a cantilever arm.

* * * * *